(12) United States Patent  
Park et al.

(10) Patent No.: US 10,473,973 B2
(45) Date of Patent: Nov. 12, 2019

(54) DISPLAY DEVICE

(71) Applicant: SAMSUNG DISPLAY CO., LTD., Yongin-si, Gyeonggi-do (KR)

(72) Inventors: Seunghyun Park, Seoul (KR); Sungin Ro, Hwaseong-si (KR); Junho Song, Seongnam-si (KR); Yeogeon Yoon, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/400,086

(22) Filed: Jan. 6, 2017

(65) Prior Publication Data
US 2017/0285400 A1 Oct. 5, 2017

(30) Foreign Application Priority Data

Apr. 4, 2016 (KR) .................. 10-2016-0041017

(51) Int. Cl.
*G02F 1/1335* (2006.01)
*G02F 1/13363* (2006.01)

(52) U.S. Cl.
CPC .... *G02F 1/133536* (2013.01); *G02F 1/13363* (2013.01); *G02F 1/133514* (2013.01); *G02F 1/133553* (2013.01); *G02F 1/133555* (2013.01); *G02F 2001/133531* (2013.01); *G02F 2001/133548* (2013.01); *G02F 2001/133565* (2013.01); *G02F 2001/133638* (2013.01); *G02F 2201/121* (2013.01); *G02F 2201/123* (2013.01); *G02F 2203/01* (2013.01); *G02F 2413/01* (2013.01); *G02F 2413/05* (2013.01)

(58) Field of Classification Search
CPC ......... G02F 1/133536; G02F 1/133514; G02F 1/133553; G02F 1/13363; G02F 2001/133531; G02F 2001/133548; G02F 2001/133638; G02F 2201/121; G02F 2201/123; G02F 2203/01; G02F 2413/01; G02F 2413/05; G02F 2001/133565; G02F 2001/2001

See application file for complete search history.

(56) References Cited

U.S. PATENT DOCUMENTS

2010/0302481 A1* 12/2010 Baum .............. B29D 11/00634
349/96
2011/0261455 A1* 10/2011 Sugita .................. G02B 5/3058
359/485.05

(Continued)

FOREIGN PATENT DOCUMENTS

| KR | 1020110076576 A | 7/2011 |
| KR | 1020140003097 A | 1/2014 |
| KR | 1020150003466 A | 1/2015 |

*Primary Examiner* — Nathanael R Briggs
(74) *Attorney, Agent, or Firm* — Cantor Colburn LLP

(57) ABSTRACT

A display device includes a first substrate and a second substrate opposing each other, a reflecting layer, which reflects light incident on the reflecting layer, on the first substrate, a polarizing layer which is disposed on the second substrate and includes a polarizing portion that polarizes light incident on the polarizing portion and a reflecting portion that reflects light incident on the reflecting portion, a liquid crystal layer between the reflecting layer and the polarizing layer, and a retardation layer between the liquid crystal layer and the polarizing layer.

26 Claims, 8 Drawing Sheets

(56) References Cited

U.S. PATENT DOCUMENTS

| | | | |
|---|---|---|---|
| 2013/0033662 A1* | 2/2013 | Chung | G02F 1/133528 349/96 |
| 2014/0028956 A1* | 1/2014 | Choi | G02F 1/133528 349/96 |
| 2015/0002953 A1 | 1/2015 | Yoon | |
| 2015/0062497 A1* | 3/2015 | Nam | G02F 1/133536 349/96 |

* cited by examiner

DISPLAY DEVICE

This application claims priority to Korean Patent Application No. 10-2016-0041017, filed on Apr. 4, 2016, and all the benefits accruing therefrom under 35 U.S.C. § 119, the content of which in its entirety is herein incorporated by reference.

BACKGROUND

1. Field

Exemplary embodiments of the invention relate to a display device, and more particularly, to a mirror-type display device.

2. Description of the Related Art

A display device is classified into a liquid crystal display ("LCD") device, an organic light emitting diode ("OLED") display device, a plasma display panel ("PDP") device, an electrophoretic display ("EPD") device, and the like, based on a light emitting scheme of the display device.

As a thickness of the display device decreases, the display device is utilized in a wide range of fields. A mirror-type display device is a hybrid display device which functions as a mirror when not displaying an image and functions as a display device when displaying an image.

SUMMARY

Exemplary embodiments of the invention are directed to a display device having high reflectance and excellent display properties.

According to an exemplary embodiment, a display device includes a first substrate and a second substrate opposing each other, a reflecting layer, which reflects light incident thereon, disposed on the first substrate, a polarizing layer disposed on the second substrate and includes a polarizing portion that polarizes light incident on the polarizing portion and a reflecting portion that reflects light incident thereon, a liquid crystal layer between the reflecting layer and the polarizing layer, and a retardation layer between the liquid crystal layer and the polarizing layer.

In an exemplary embodiment, the polarizing portion of the polarizing layer may have a wire grid polarizer pattern.

In an exemplary embodiment, the reflecting portion of the polarizing layer may be a mirror reflecting layer.

In an exemplary embodiment, the polarizing layer may further include a metal.

In an exemplary embodiment, the metal may include at least one of aluminum (Al), silver (Ag), titanium (Ti), and chromium (Cr).

In an exemplary embodiment, an angle between a slow axis of the retardation layer and a polarization axis of the polarizing layer may be about 45 degrees.

In an exemplary embodiment, the retardation layer may be a quarter-wave plate.

In an exemplary embodiment, the display device may further include a pixel electrode on the first substrate.

In an exemplary embodiment, the reflecting layer may be a pixel electrode.

In an exemplary embodiment, the display device may further include a common electrode on the second substrate.

In an exemplary embodiment, the display device may further include a plurality of color filters on the polarizing layer.

In an exemplary embodiment, the plurality of color filters may include a first color filter, a second color filter, a third color filter, and a fourth color filter. The first, second, and third color filters may be disposed on the polarizing portion of the polarizing layer, and a fourth color filter may be disposed on the reflecting portion of the polarizing layer.

In an exemplary embodiment, the first color filter may be a red color filter, a second color filter may be a green color filter, and a third color filter may be a blue color filter.

In an exemplary embodiment, the fourth color filter may be a white color filter.

In an exemplary embodiment, the fourth color filter may be a transparent portion.

In an exemplary embodiment, the fourth color filter may be a blue color filter.

According to an exemplary embodiment, a display device includes a first substrate and a second substrate opposing each other, a liquid crystal layer between the first substrate and the second substrate, a backlight unit which is disposed on the first substrate opposite to the second substrate and provides light to the first substrate, an upper polarizing layer which is disposed on the second substrate and includes a polarizing portion that polarizes light incident on the polarizing portion and a reflecting portion that reflects light incident on the reflecting portion, and a lower polarizing layer between the first substrate and the backlight unit.

In an exemplary embodiment, the polarizing portion may have a wire grid polarizer pattern.

In an exemplary embodiment, the reflecting portion may have a mirror reflecting layer.

In an exemplary embodiment, the upper polarizing layer may further include a metal.

In an exemplary embodiment, the metal may include at least one of aluminum (Al), silver (Ag), titanium (Ti), and chromium (Cr).

In an exemplary embodiment, an angle between a light transmission axis of the upper polarizing layer and a light transmission axis of the lower polarizing layer may be about 90 degrees.

The foregoing is illustrative only and is not intended to be in any way limiting. In addition to the illustrative exemplary embodiments and features described above, further exemplary embodiments and features will become apparent by reference to the drawings and the following detailed description.

BRIEF DESCRIPTION OF THE DRAWINGS

The above and other features and advantages of this disclosure will be more clearly understood from the following detailed description taken in conjunction with the accompanying drawings, in which.

DETAILED DESCRIPTION

Figure 1:
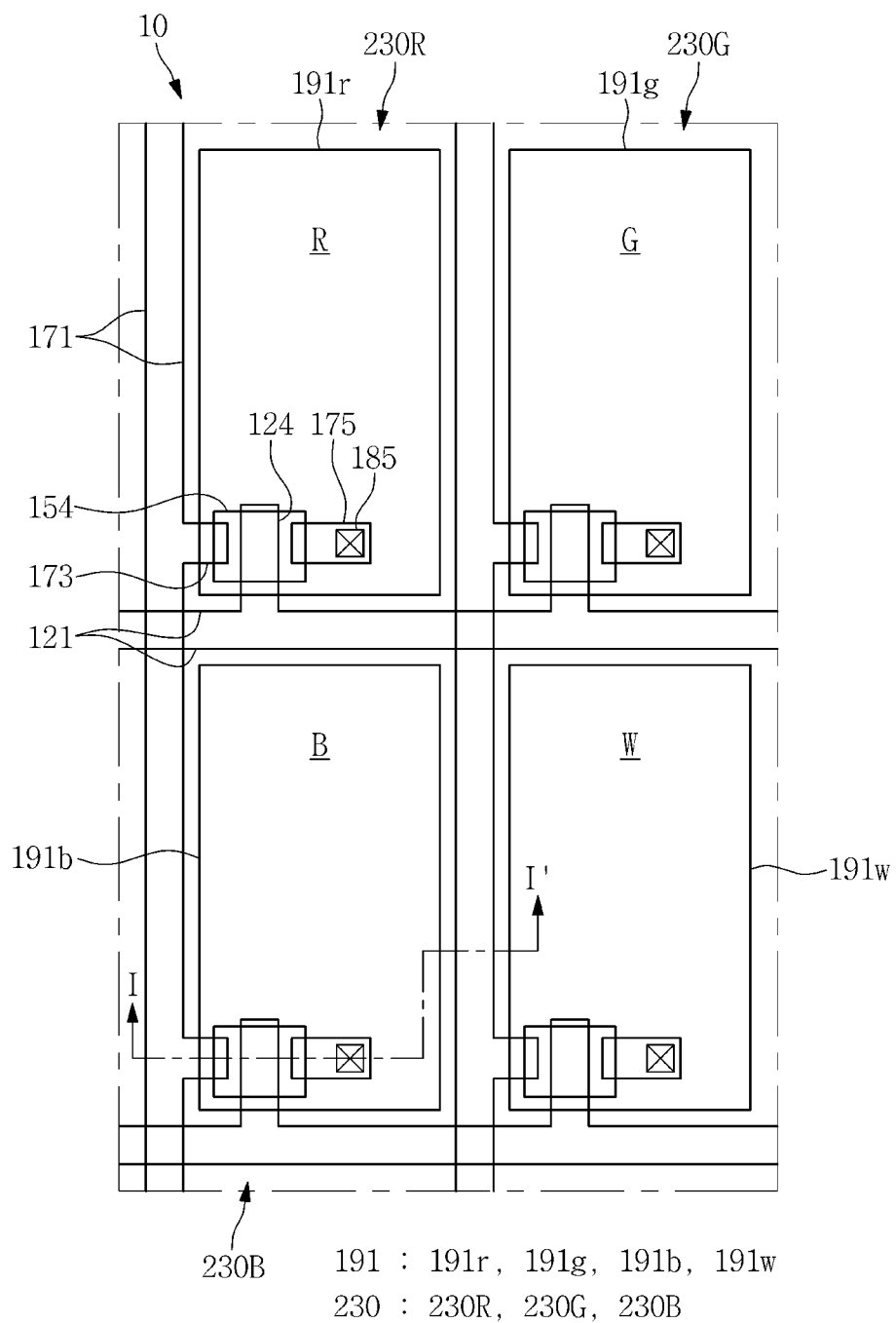
FIG. 1 is a schematic plan view illustrating an exemplary embodiment of a pixel unit.

Advantages and features of the invention and methods for achieving them will be made clear from exemplary embodiments described below in detail with reference to the accompanying drawings. The invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art. The invention is merely defined by the scope of the claims. Therefore, well-known constituent elements, operations, and techniques are not described in detail in the exemplary embodiments in order to prevent the invention from being obscurely interpreted. Like reference numerals refer to like elements throughout the specification.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. In contrast, when a layer, area, or plate is referred to as being "directly on" another layer, area, or plate, there are no intervening layers, areas, or plates present. Further, when a layer, area, or plate is referred to as being "below" another layer, area, or plate, it may be directly below the other layer, area, or plate, or intervening layers, areas, or plates may be present therebetween. In contrast, when a layer, area, or plate is referred to as being "directly below" another layer, area, or plate, there are no intervening layers, areas, or plates present.

The spatially relative terms "below", "beneath", "less", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts which are not associated with the description may not be provided in order to specifically describe exemplary embodiments of the invention, and like reference numerals refer to like elements throughout the specification.

It is assumed that exemplary embodiments of the display device are a liquid crystal display ("LCD") device. In addition, it is assumed that exemplary embodiments of the display device have a structure in which a thin film transistor ("TFT") and a color filter are disposed on different substrates, respectively. However, the invention is not limited thereto. In another exemplary embodiment, the display device may be applicable to a structure in which a transistor and a color filter are disposed on different substrates, respectively.

While being applicable in a wide range of industries, a mirror-type display device is in need of further technology development to have properties of both a mirror and a display device. In particular, it is difficult for the mirror-type display device to reflect visible light sufficiently in a mirror mode while the device keeps the properties of a display device in a display mode.

An exemplary embodiment of a display device will be described with reference to FIGS. 1, 2, 3, 4, and 5. A reflective LCD device will be described as the exemplary embodiment of a display device.

At least one pixel unit includes first, second, third, and fourth pixels. In an exemplary embodiment, the first, second, and third pixels may respectively be one of red, green, and blue pixels, for example. Hereinafter, the first, second, and third pixels are assumed to be red, green, and blue pixels, respectively, for ease of description.

In an exemplary embodiment, for example, the fourth pixel may be a transparent pixel or a white pixel. For ease of descriptions, it is assumed that the fourth pixel is a white pixel.

In an exemplary embodiment, for example, each of the first, second, and third color filters may have one of red, green, blue, yellow, cyan, and magenta colors. For ease of descriptions, it is assumed that the first, second, and third color filters are red, green, and blue color filters, respectively.

Figure 2:
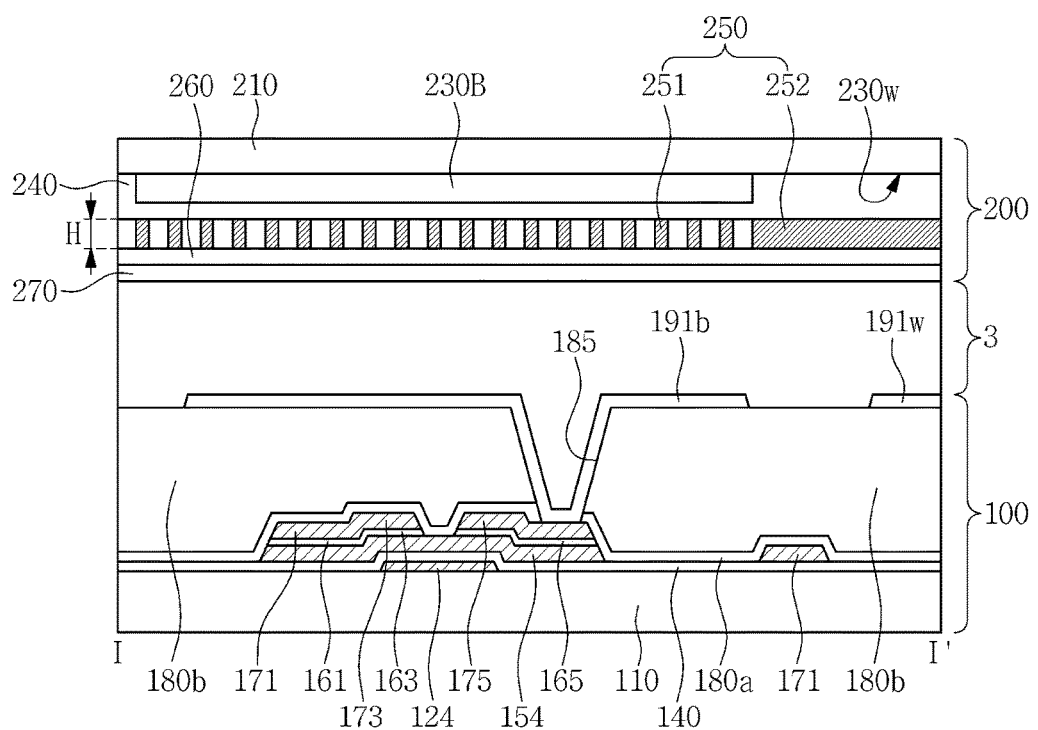
FIG. 2 is a cross-sectional view taken along line I-I' of FIG. 1.

FIG. 1 is a schematic plan view illustrating an exemplary embodiment of a pixel unit, and FIG. 2 is a cross-sectional view taken along line I-I' of FIG. 1.

Referring to FIG. 1, the exemplary embodiment of a display device includes at least one pixel unit 10. The pixel unit 10 includes a red pixel R, a green pixel G, a blue pixel B, and a white pixel W. In an exemplary embodiment, as illustrated in FIG. 1, a single pixel unit 10 includes the red pixel R, the green pixel G, the blue pixel B, and the white pixel W which are arranged in a 2×2 matrix form. The red pixel R and the green pixel G are sequentially arranged along a first row, and the blue pixel B and the white pixel W are sequentially arranged along a second row which is adjacent to the first row. Gate lines 121 and data lines 171 are arranged in a matrix form, and the pixels in the pixel units 10 are connected to respective combinations of one of the gate lines 121 and one of the data lines 171.

In FIG. 1, one pixel unit is illustrated for ease of description. However, in an exemplary embodiment, a plurality of pixel units 10 is arranged on a first substrate 110 in a matrix form, having a plurality of columns and a plurality of rows. Respective ones of the pixel units 10 have the same structure. Hereinafter, a single pixel unit 10 will be described by way of example. In FIG. 1, the pixel unit 10 is described as a 2×2 matrix. However, the invention is not limited thereto. In another exemplary embodiment, the shape of the pixel unit 10 may be modified into various shapes such as a linear shape, a V-like shape, and a Z-like shape.

Referring to FIGS. 1 and 2, hereinafter, pixel electrodes 191r, 191g, 191b, and 191w are collectively referred as a pixel electrode 191. The pixel electrode 191 includes a conductive material having reflectance. In an exemplary embodiment, for example, the pixel electrode 191 includes a metal material having excellent reflectance. The pixel electrode 191 serves the function of a reflective electrode and the function of a pixel electrode at the same time. Hereinafter, the red pixel R, the green pixel G, and the blue pixel B are collectively referred to as a color pixel, for ease of description.

The LCD device having the above-described structure is operated as a reflective display device. Natural light or ambient light incident to the LCD device is reflected from the pixel electrode 191 and transmitted through a liquid crystal layer 3 such that an image provided by the LCD device can be displayed.

Hereinafter, configurations of the LCD device will be described in detail.

The LCD device includes a lower display plate 100 and an upper display plate 200 opposing each other, and a liquid crystal layer 3 between the lower display plate 100 and the upper display plate 200.

Hereinafter, the lower display plate 100 will be described.

The gate lines 121 (refer to FIG. 1) are disposed on the first substrate 110.

Each of the gate lines 121 includes gate electrodes 124 and transmits a gate signal to the gate electrodes 124. In FIG. 1, the gate lines 121 extend in a transverse direction.

A gate insulating layer 140 is disposed on the gate line 121. In an exemplary embodiment, the gate insulating layer 140 may include an inorganic insulating material such as silicon nitride (SiNx) or silicon oxide (SiOx).

A plurality of semiconductor layers 154 is disposed on the gate insulating layer 140. The semiconductor layer 154 includes a protrusion portion protruding along the gate electrode 124. In an alternative exemplary embodiment, the semiconductor layer 154 may be disposed on the gate electrode 124 without a protrusion.

In an exemplary embodiment, for example, the semiconductor layer 154 may include amorphous silicon, polycrystalline silicon, or an oxide semiconductor. In an exemplary embodiment, for example, the oxide semiconductor may include at least one of zinc (Zn), gallium (Ga), indium (In), and tin (Sn).

In an exemplary oxide semiconductor, for example, the oxide semiconductor may include an oxide semiconductor material such as an oxide based on zinc (Zn), gallium (Ga), tin (Sn), or indium (In), or a composite oxide thereof, e.g., zinc oxide (ZnO), indium-gallium-zinc oxide (InGaZnO4), indium-zinc oxide (In—Zn—O), or zinc-tin oxide (Zn—Sn—O).

In an exemplary embodiment, for example, the oxide semiconductor may include an indium gallium zinc oxide ("IGZO")-based oxide including indium (In), gallium (Ga), zinc (Zn), and oxygen (O). In an alternative exemplary embodiment, for example, the oxide semiconductor may include In—Sn—Zn—O-based metal oxide, In—Al—Zn—O-based metal oxide, Sn—Ga—Zn—O-based metal oxide, Al—Ga—Zn—O-based metal oxide, Sn—Al—Zn—O-based metal oxide, In—Zn—O-based metal oxide, Sn—Zn—O-based metal oxide, Al—Zn—O-based metal oxide, In—O-based metal oxide, Sn—O-based metal oxide, and Zn—O-based metal oxide.

A plurality of ohmic contact members 161, 163, and 165 is disposed on the semiconductor layer 154 and the protruding portion of the semiconductor layer 154. The ohmic contact members 161, 163, and 165 are disposed on the semiconductor layer 154, respectively forming pairs with respect to the gate electrode 124.

In an exemplary embodiment, for example, the ohmic contact members 161, 163, and 165 may include silicide or n+ hydrogenated amorphous silicon doped with n-type impurities, such as phosphorus, at high concentration.

A data conductor including the plurality of data lines 171 and a plurality of drain electrodes 175 is disposed on the ohmic contact members 161, 163, and 165.

Each of the data lines 171 includes source electrodes 173 which extend toward the gate electrode 124 and transmits a data signal to the source electrodes 173. In FIG. 1, the data lines 171 substantially extend in a longitudinal direction and intersect the gate lines 121.

Even though not illustrated in the drawings, in an exemplary embodiment, the drain electrode 175 may include, with respect to the gate electrode 124, a bar-shaped end portion which opposes the source electrode 173 and another end portion having a larger planar area than that of the bar-shaped portion.

A TFT which is a switching element includes the gate electrode 124, the source electrode 173, the drain electrode 175, and semiconductor layer 154. Except for a channel portion, the semiconductor layer 154 may have substantially the same cross-sectional shape as those of the data line 171 and the drain electrode 175, and the ohmic contact members 161, 163, and 165 below the data line 171 and the drain electrode 175, as shown in FIG. 2.

In an exemplary embodiment, a first insulating layer 180a is disposed on the data conductor, e.g., the data line 171 and the drain electrode 175, and an exposed portion of the semiconductor layer 154, and the first insulating layer 180a may include an organic insulating material or an inorganic insulating material, for example. In an alternative exemplary embodiment, the first insulating layer 180a may be omitted.

A second insulating layer 180b is disposed on the first insulating layer 180a. The second insulating layer 180b may include an organic material. The second insulating layer 180b is disposed on the gate line 121, the data line 171, and the TFT.

The pixel electrode 191 is disposed on the second insulating layer 180b. The pixel electrode 191 is electrically connected to the drain electrode 175 through a contact hole 185 to receive a data voltage. The pixel electrode 191 applied with the data voltage and a common electrode 270 applied with a common voltage generate an electric field over the liquid crystal layer 3. Pixel electrodes 191r, 191g, and 191b are in the respective color pixels, and a pixel electrode 191w is in the white pixel W. The pixel electrode 191 includes a conductive material having reflectance.

Hereinafter, the upper display plate 200 will be described, and a red color filter 230R, a green color filter 230G, a blue color filter 230B, a transparent portion 230w, and a thin blue color filter 230B" are collectively referred as a color filter 230.

The red color filter 230R, the green color filter 230G, and the blue color filter 230B are disposed respectively on areas corresponding to the areas of the red pixel R, the green pixel G, and the blue pixel B on a second substrate 210. A light blocking member, referred to as a black matrix, is omitted. Accordingly, color filters 230 may overlap one another in boundary areas. The color filter 230 may include a transparent portion 230w in an area corresponding to the area of the white pixel W. In an exemplary embodiment, no particular color filter is disposed in the transparent portion 230w, and then the white pixel W functions as a transparent pixel. In an alternative exemplary embodiment, a white color filter may be disposed in the transparent portion 230w. Each of the color filters 230 except for the transparent portion 230w may distinctly represent one of primary colors. In an exemplary embodiment, for example, the primary color may include three primary colors of red, green, and blue, or yellow, cyan, and magenta. The color filter 230 may include an organic material.

An overcoat layer 240 may be disposed on the color filters 230 including the transparent portion 230w. The overcoat layer 240 prevents exposure of the color filter 230 and provides a planar surface. In an alternative exemplary embodiment, the overcoat layer 240 may be omitted.

A polarizing layer 250 is disposed on the overcoat layer 240. An exemplary embodiment of the polarizing layer 250 is depicted as being disposed on a surface of the second substrate 210 that faces the first substrate 110. However, the invention is not limited thereto. In another exemplary embodiment, the polarizing layer 250 may be disposed on another surface of the second substrate 210 opposite to the first substrate 110.

Referring to FIG. 2, the polarizing layer 250 includes a polarizing portion 251 that polarizes incident light and a reflecting portion 252 that reflects incident light.

The polarizing portion 251 serves to convert natural light into linearly polarized light having a predetermined inclination. That is, the polarizing portion 251 serves to transmit only linearly polarized light parallel to a polarization axis. The reflecting portion 252 serves to mirror-reflect natural light.

Hereinafter, the exemplary embodiment of a polarizing layer will be described with reference to FIGS. 3, 4, and 5.

Figure 3:
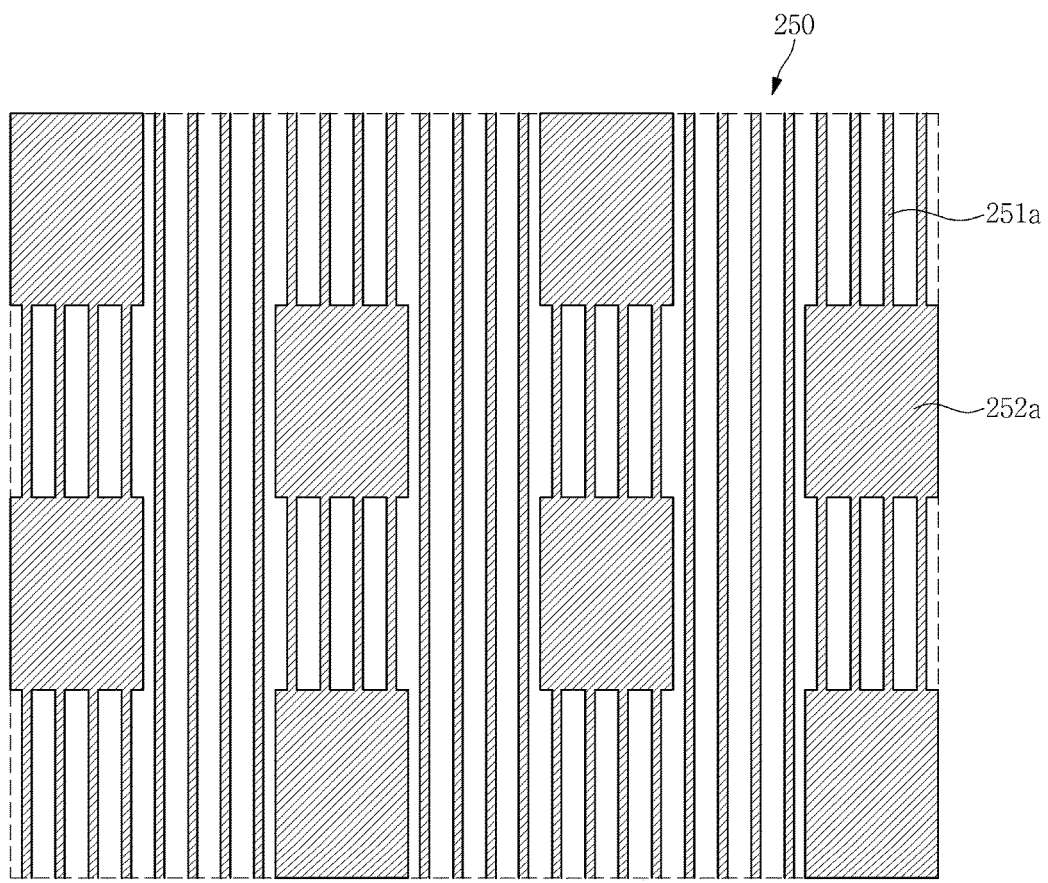
FIG. 3 is a plan view illustrating an exemplary embodiment of a polarizing layer.
Figure 4:
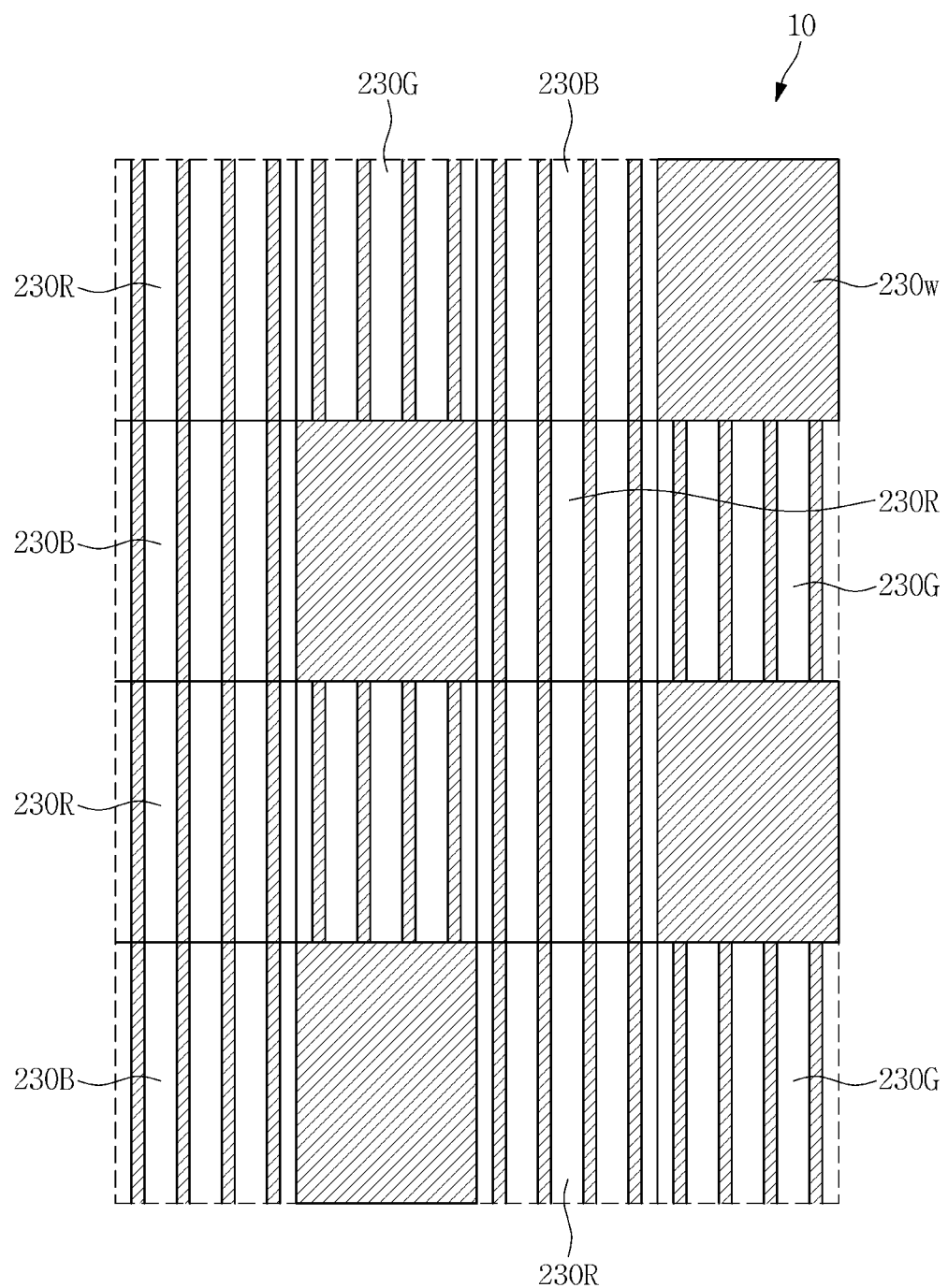
FIG. 4 is a plan view illustrating an exemplary embodiment of the polarizing layer of FIG. 3 and a plurality of pixel units.
Figure 5:
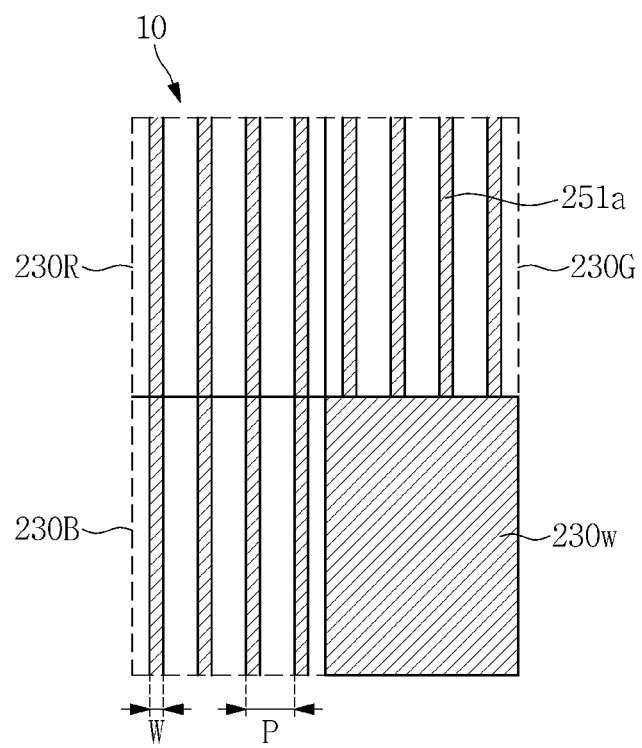
FIG. 5 is a plan view illustrating an exemplary embodiment of the polarizing layer of FIG. 3 and a single pixel unit.

FIG. 3 is a plan view illustrating an exemplary embodiment of the polarizing plate, FIG. 4 is a plan view illustrating an exemplary embodiment of the polarizing plate of FIG. 3 and a plurality of pixel units, and FIG. 5 is a plan view illustrating an exemplary embodiment of the polarizing plate of FIG. 3 and a single pixel unit.

As illustrated in FIG. 3, the polarizing layer 250 includes an area in which wires 251a are arranged a predetermined distance spaced apart from one another and an area in which a metal layer 252a is disposed. The area disposed with the wires 251a corresponds to the polarizing portion 251 of the polarizing layer 250, and the area disposed with the metal layer 252a corresponds to the reflecting portion 252 of the polarizing layer 250.

The wire 251a may include a metal. In an exemplary embodiment, for example, the wire 251a may include at least one of aluminum (Al), silver (Ag), titanium (Ti), and chromium (Cr).

FIG. 4 illustrates an example in which a wire grid polarizer pattern is in the red pixels R, the green pixels G, and the blue pixels B of the plurality of pixel units 10. The wire grid polarizer pattern is a stripe pattern that has smaller line width and interval than wavelengths of red, green, and blue colors, that is, a visible light range perceivable to humans. When light is incident to the wire grid polarizer pattern, polarized light that is parallel to the wire grid polarizer pattern is reflected while polarized light that is perpendicular to the wire grid polarizer pattern is transmitted through the wire grid polarizer pattern.

As described hereinabove with reference to FIG. 1, the red color filter 230R, the green color filter 230G, and the blue color filter 230B are disposed respectively on the red pixel R, the green pixel G, and the blue pixel B. In the case that the color filter 230 is absent in the area corresponding to the white pixel W, the white pixel W functions as a transparent pixel.

Referring to FIGS. 2 and 4, the polarizing portion 251 of the polarizing layer 250 in which the wires 251a are arranged is disposed on the red color filter 230R, the green color filter 230G, and the blue color filter 230B, and the reflecting portion 252 of the polarizing layer 250 in which the metal layer 252a is disposed is disposed on the transparent portion 230w.

In an exemplary embodiment of manufacturing the wire grid polarizer pattern, an imprinting resin including a conductive material is disposed on a substrate, and in such a state, the imprinting resin is repeatedly imprinted using a stamp having a wire grid polarizer pattern. In an alternative exemplary embodiment, the wire gird pattern may be manufactured by a lithography process based on laser interference using a mask having a pattern corresponding to the wire grid polarizer pattern.

The wire grid polarizer pattern has an arrangement structure perpendicular to a boundary interface of a sub-pixel. In an alternative exemplary embodiment, the wire grid polarizer pattern may have an arrangement structure parallel to the boundary interface of the sub-pixel.

FIG. 5 illustrates an example of a wire grid polarizer pattern, having predetermined width W and period P, which is in the red pixel R, the green pixel G, and the blue pixel B of a single pixel unit.

It is illustrated in the drawings that the wire grid polarizer pattern has the same width W and period P in every pixel, but the width W and the period P of the wire grid polarizer pattern may vary according to the color of the pixel. In an exemplary embodiment, for example, the widths W of the wire grid polarizer patterns in respective pixels may have the following relationship, red pixel R>green pixel G>blue pixel B.

In such an exemplary embodiment, for example, with respect to the wire grid polarizer pattern in respective pixel of red, green, and blue colors, a duty cycle of the wire grid polarizer pattern may be represented as follows:

$$DC=W/P,$$

where P denotes a period of the wire grid polarizer pattern, and W denotes a width of the wire grid polarizer pattern.

Values of a period P, a width W, a height H (refer to FIG. 2), and a duty cycle DC of the wire grid polarizer may be selected based on wavelengths of respective color lights (R, G, and B) of a pixel unit.

Referring back to FIG. 2, a retardation layer 260 is disposed on the polarizing layer 250.

The retardation layer 260 serves to change a polarization state of light. That is, the retardation layer 260 retards a phase of light. The retardation layer 260 may convert linearly polarized light into circularly polarized light or may convert circularly polarized light into linearly polarized light.

The retardation layer 260 may include a retardation plate having a film shape.

In an exemplary embodiment, an angle between a slow axis of the retardation layer 260 and a polarization axis of the polarizing layer 250 is about 45 degrees, for example.

The retardation plate may be manufactured by elongation of a film. In an exemplary embodiment, for example, the retardation plate may be manufactured by elongating a film including a polymer such as polycarbonate, polyvinyl alcohol, polystyrene, polymethyl methacrylate, polypropylene, polyolefin, polyarylate, and polyamide.

In addition, photocurable liquid crystals may be used in manufacturing of the retardation plate. In an exemplary embodiment, for example, liquid crystals are oriented on the polymer-based film to thereby form a liquid crystal pattern, thus forming the retardation plate. In an exemplary embodiment, for example, the retardation plate manufactured in such a manner may be a quarter-wave plate ("QWP"), or a half-wave plate ("HWP") based on an arrangement of an alignment layer and the liquid crystals.

A QWP may be used as an exemplary embodiment of the retardation layer 260 of FIG. 2. However, the invention is not limited thereto, and in another exemplary embodiment, the QWP and the HWP may be used together as the retardation layer 260.

The common electrode 270 is disposed on the retardation layer 260. In an exemplary embodiment, the common electrode 270 may include a transparent conductive material such as indium zinc oxide ("ITO") or indium tin oxide ("IZO"). The common electrode 270 has a planar shape, and may be as a whole plate disposed over an entire surface of the second substrate 210.

An alignment layer (not illustrated) is disposed on an inner surface of each of the lower display plate 100 and the upper display plate 200.

The liquid crystal layer 3 between the lower display plate 100 and the upper display plate 200 includes liquid crystal molecules (not illustrated), and the liquid crystal molecules may be aligned so that a major axis thereof is perpendicular to surfaces of the lower display plate 100 and the upper display plate 200 in the absence of an electric field.

The liquid crystal layer 3 may have a positive dielectric anisotropy, or may have a negative dielectric anisotropy. The liquid crystal molecules of the liquid crystal layer 3 may be oriented to be pretilted in a predetermine direction, and the pretilted direction of the liquid crystal molecules may vary based on the dielectric anisotropy of the liquid crystal layer 3.

The pixel electrode 191 applied with the data voltage and the common electrode 270 applied with the common voltage generate an electric field over the liquid crystal layer 3, and thereby orientation of the liquid crystal molecules of the liquid crystal layer 3 is determined, and a corresponding image may be displayed on the display device accordingly.

External light incident to the exemplary embodiment of a reflective LCD device of FIG. 2 is transmitted through the second substrate 210 and the transparent portion 230w of the color filter 230 to be reflected from the reflecting portion 252 of the polarizing layer 250 without experiencing a change in an axis of the light, and serves a mirror function.

On the other hand, in general, external light incident to a conventional reflective LCD device is linearly polarized by a polarizing layer and circularly polarized by a retardation layer. A fraction of the circularly polarized external light reaching inside the display device serves a display function, and another fraction thereof is reflected from a mirror reflecting layer to be a reflected light. In such an example, during the reflection, a phase and a polarization axis of the light are changed. The reflected light having a changed phase may not be transmitted through the polarizing layer, and thus may not serve the mirror function.

Accordingly, in the exemplary embodiment of the display device of FIG. 2, the polarizing layer including the polarizing portion that polarizes incident light and the reflecting portion that reflects incident light is provided such that the display device may serve both the mirror function with high reflectance and the display function.

Hereinafter, other exemplary embodiments of an LCD device will be described with reference to FIGS. 6, 7, and 8. For ease of description, the same configurations as those of the first exemplary embodiment will be omitted.

Figure 6:
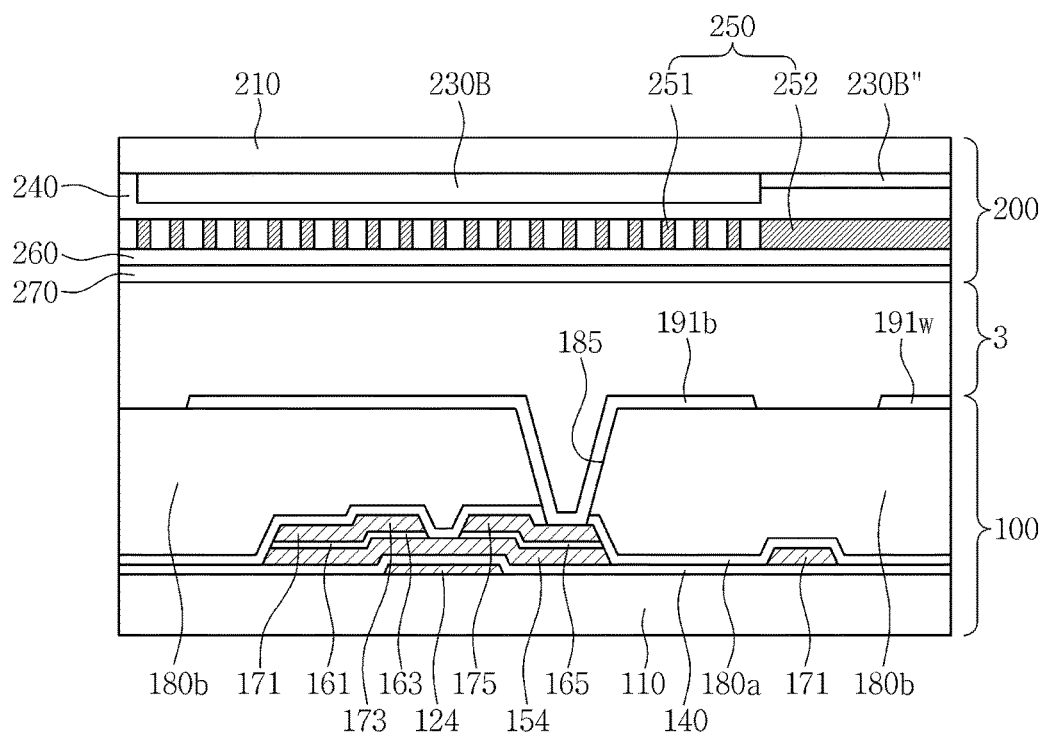
FIG. 6 is a cross-sectional view illustrating an exemplary embodiment of a display device.

FIG. 6 is a cross-sectional view illustrating an exemplary embodiment of a display device.

Referring to FIG. 6, the exemplary embodiment of a display device includes a thin blue color filter 230B" on a second substrate 210 corresponding to a white pixel W. The thickness of the thin blue color filter 230B" in a vertical direction in FIG. 6 is less than that of the other color filters 230.

In the exemplary embodiment of a display device, for example, a red color filter 230R, a green color filter 230G, a blue color filter 230B, and a thin blue color filter 230B" are disposed on the second substrate 210 respectively corresponding to a red pixel R, a green pixel G, a blue pixel B, and the white pixel W, and an overcoat layer 240, a polarizing layer 250, a retardation layer 260, and a common electrode 270 are disposed thereon.

In an exemplary embodiment, the polarizing layer 250 includes a polarizing portion 251 that polarizes incident light and a reflecting portion 252, and the reflecting portion 252 of the polarizing layer 250 is disposed on the thin blue color filter 230B".

When the exemplary embodiment of a display device serves the mirror function, the light incident from outside of the display device is mirror-reflected from the reflecting portion 252 to be transmitted through the thin blue color filter 230B". Typically, a metal appears yellowish, and thus light reflected from the reflecting portion 252 may appear yellowish when emitted outside the display device. The thin blue color filter 230B" serves to change chromatic coordinates of the yellowish light to reduce the yellowish effect.

In the case that the color filter 230 includes the thin blue color filter 230B" in an area corresponding to the white pixel W, the white pixel W may function as a color compensation pixel.

The exemplary embodiment of a display device has substantially the same configurations and effects as those of the exemplary embodiment of the display device in FIG. 2.

Figure 7:
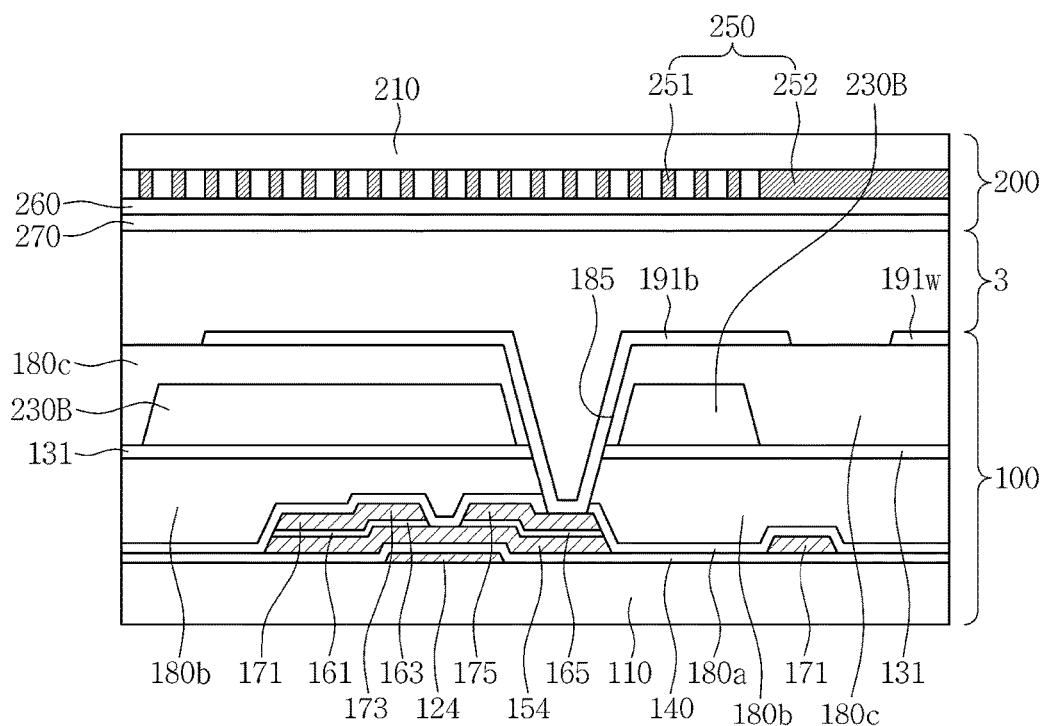
FIG. 7 is a cross-sectional view illustrating another exemplary embodiment of a display device.

FIG. 7 is a cross-sectional view illustrating another exemplary embodiment of a display device.

Referring to FIG. 7, in the exemplary embodiment of a display device, a color filter 230 is disposed on a first substrate 110. In detail, a TFT, a gate line 121, a data line 171, a gate insulating layer 140, a first insulating layer 180a, and a second insulating layer 180b of the exemplary embodiment of a display device have substantially the same structures and position as those of the exemplary embodiment of a display device of FIG. 2, respectively.

A reflecting layer 131 is disposed on the second insulating layer 180b. In order to enhance the reflectance of external light, the reflecting layer 131 is disposed over the entire surface of the first substrate 110, except for a contact hole 185 exposing a drain electrode 175. The reflecting layer 131 is disposed between the color filter 230 and the second insulating layer 180b. In an exemplary embodiment, for example, the reflecting layer 131 may include a reflective metal such as aluminum, silver, chromium or any alloys thereof.

In an exemplary embodiment, the reflecting layer 131 is not connected to a signal line, such as a gate line 121 and a data line 171, and merely serves to reflect externally incident light, for example.

In an exemplary embodiment, for example, an unevenness (not illustrated) may be provided on the reflecting layer 131 so as to enhance the efficiency of reflecting the light incident from outside of the display device.

The color filter 230 is disposed on the reflecting layer 131. The color filter 230 is disposed on corresponding ones of color pixels.

A third insulating layer 180c is disposed on the reflecting layer 131 and the color filter 230. The third insulating layer 180c may be an inorganic insulating layer, prevent components of the color filter 230 from being exposed, and prevent deformation and discoloration of the color filter 230.

The pixel electrode 191 may include a transparent conductive electrode, which is dissimilar to the exemplary embodiment of the pixel electrode 191 in FIG. 2. That is, the reflecting layer 131 serves to reflect external light, instead of the pixel electrode 191. In an exemplary embodiment, for example, the pixel electrode 191 may include a transparent conductive material such as ITO and IZO.

Other than the above configurations, the exemplary embodiment of a display device may have substantially the same configurations and effects as those of the exemplary embodiment of a display device of FIG. 2.

Hereinafter, an alternative exemplary embodiment of a display device will be described with reference to FIG. 8.

Figure 8:
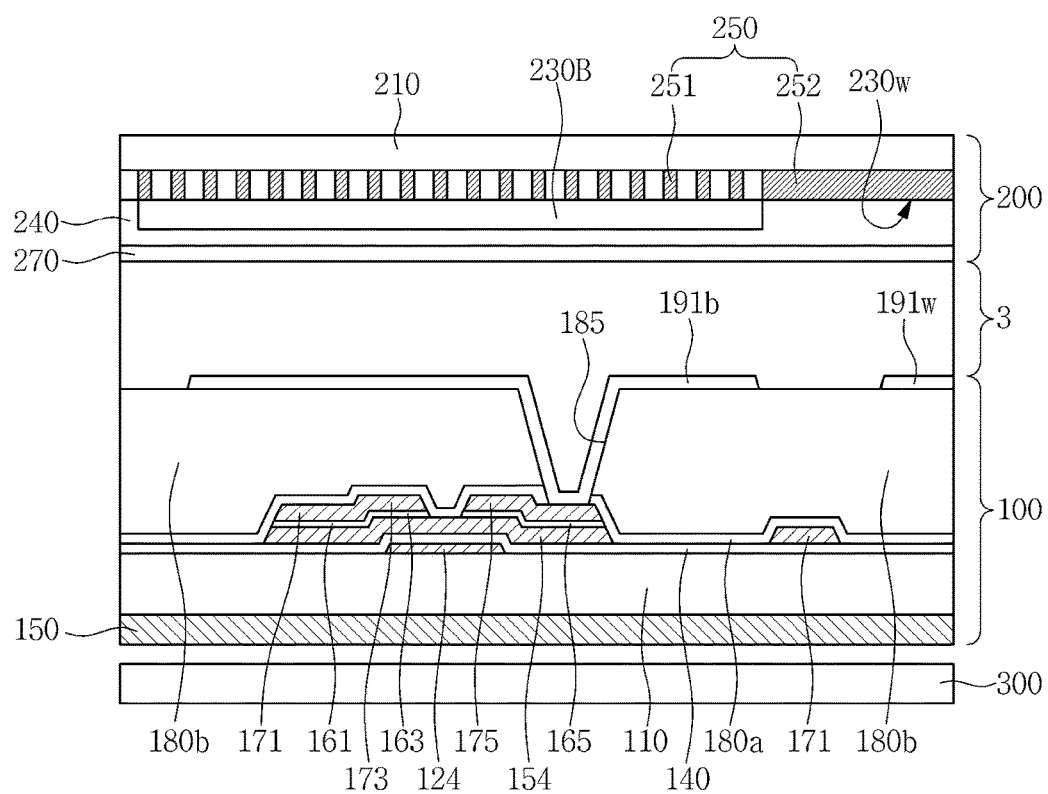
FIG. 8 is a cross-sectional view illustrating an alternative exemplary embodiment of a display device.

FIG. 8 is a cross-sectional view illustrating the alternative exemplary embodiment of a display device. A transmissive LCD device will be described as the alternative exemplary embodiment of a display device.

The alternative exemplary embodiment of the display device includes a first substrate 110, a second substrate 210 opposing the first substrate 110, and a liquid crystal layer 3 between the first substrate 110 and the second substrate 210.

In an exemplary embodiment, the first substrate 110 may be a transparent insulating substrate including a predetermined glass material, and a pixel electrode 191 may include a metal oxide that includes ITO or IZO, having conductivity and transmittance, for example.

A backlight unit 300 may be provided on the first substrate 110 opposite to the second substrate 210 to emit light to the first substrate 110. In an exemplary embodiment, the backlight unit 300 may include a lamp to provide light, a conductive plate to uniformly distribute the light over the entire area of the substrate, and other films, for example.

The second substrate 210 may be a transparent insulating substrate including a predetermined glass material. A color filter 230 including red, green, and blue color filters and a common electrode 270 are sequentially stacked over the entire area of a corresponding one of pixels on a surface of the second substrate 210, taken in a direction toward the liquid crystal layer 3. Herein, the common electrode 270 may include the same material as the material included in the pixel electrode 191.

In addition, the alternative exemplary embodiment of a display device includes a pair of polarizing layers including an upper polarizing layer 250 and a lower polarizing layer 150 between a side of the second substrate 210 facing the liquid crystal layer 3 and a side of the first substrate opposite to the liquid crystal layer 3, that is, between the first substrate 110 and the backlight unit 300.

Herein, the upper polarizing layer 250 is the same as the exemplary embodiment of a polarizing layer in FIG. 2. In detail, the upper polarizing layer 250 includes a polarizing portion 251 that polarizes incident light and a reflecting portion 252 that reflects incident light. The polarizing portion 251 has a wire grid polarizer pattern, and the reflecting portion 252 has a mirror reflecting layer.

In an exemplary embodiment, the lower polarizing layer 150 may include a conventional polarizing plate including, for example, a poly vinyl alcohol ("PVA") film oriented by absorbing iodine in an adhering manner, and a film protecting the PVA film.

Respective light transmission axes of the polarizing portion 251 of the upper polarizing layer 250 and the lower polarizing layer 150 may be perpendicular to each other.

In a conventional transmissive LCD device, natural light which generates mirror reflection is transmitted through an upper polarizing layer, disposed on the opposite side from a liquid crystal layer of a second substrate, twice when being incident and emitted, thus generating a light loss.

However, in the alternative exemplary embodiment of a display device, natural light which generates mirror reflection is mirror-reflected from the reflecting portion 252 of the polarizing layer 250 after being incident thereto, and is not transmitted through the polarizing portion 251, such that the alternative exemplary embodiment of a display device may be used as a mirror-type display device having less light loss and high reflectance.

As set forth above, according to one or more exemplary embodiment, a polarizing layer including a polarizing portion and a reflecting portion is provided in a display device, and thus the display device may serve as both a mirror-type display device having high reflectance and a display device displaying an image.

According to one or more exemplary embodiment, a wire grid polarizer pattern and a mirror reflecting layer are disposed in the same layer in a display device, which enables omission of a separate polarizing plate, such that a thickness of the display device may effectively decrease, and a manufacturing cost thereof may be substantially reduced.

Further, according to one or more exemplary embodiment, a mirror reflecting layer in a display device serves to divide each pixel from adjacent ones of the pixels, which enables omission of a separate black matrix, such that a thickness of the display device may effectively decrease, and a manufacturing cost thereof may be substantially reduced.

From the foregoing, it will be appreciated that various exemplary embodiments in accordance with the present disclosure have been described herein for purposes of illustration, and that various modifications may be made without departing from the scope and spirit of the present teachings. Accordingly, the various exemplary embodiments disclosed herein are not intended to be limiting of the true scope and spirit of the present teachings. Various features of the above-described and other exemplary embodiments can be mixed and matched in any manner, to produce further exemplary embodiments consistent with the invention.

What is claimed is:

1. A display device comprising:
   a first substrate and a second substrate opposing each other;
   a reflecting layer on the first substrate, the reflecting layer reflects light incident on the reflecting layer;
   a polarizing layer which is disposed on the second substrate and comprises:
      a polarizing portion which polarizes light incident on the polarizing portion; and
      a reflecting portion which reflects light incident on the reflecting portion;
   a liquid crystal layer between the reflecting layer and the polarizing layer; and
   a retardation layer between the liquid crystal layer and the polarizing layer,
   wherein the polarizing portion is connected to the reflecting portion.

2. The display device as claimed in claim 1, wherein the polarizing portion of the polarizing layer has a wire grid polarizer pattern.

3. The display device as claimed in claim 1, wherein the reflecting portion of the polarizing layer is a mirror reflecting layer.

4. The display device as claimed in claim 1, wherein the polarizing layer further comprises a metal.

5. The display device as claimed in claim 4, wherein the metal comprises at least one of aluminum (Al), silver (Ag), titanium (Ti), and chromium (Cr).

6. The display device as claimed in claim 1, wherein an angle between a slow axis of the retardation layer and a polarization axis of the polarizing layer is about 45 degrees.

7. The display device as claimed in claim 1, wherein the retardation layer is a quarter-wave plate.

8. The display device as claimed in claim 1, further comprising a pixel electrode on the first substrate.

9. The display device as claimed in claim 1, wherein the reflecting layer is a pixel electrode.

10. The display device as claimed in claim 1, further comprising a common electrode on the second substrate.

11. The display device as claimed in claim 1, further comprising a plurality of color filters on the polarizing layer.

12. The display device as claimed in claim 11,
    wherein the plurality of color filters comprises a first color filter, a second color filter, a third color filter, and a fourth color filter, and
    wherein the first color filter, the second color filter, and the third color filter are disposed on the polarizing portion of the polarizing layer and the fourth color filter is disposed on the reflecting portion of the polarizing layer.

13. The display device as claimed in claim 12, wherein the first color filter is a red color filter, the second color filter is a green color filter, and the third color filter is a blue color filter.

14. The display device as claimed in claim 12, wherein the fourth color filter is disposed on a white pixel.

15. The display device as claimed in claim 12, wherein the fourth color filter is a transparent portion.

16. The display device as claimed in claim 14, wherein the fourth color filter is a thin blue color filter less than thickness of the blue color filter.

17. A display device comprising:
    a first substrate and a second substrate opposing each other;
    a liquid crystal layer between the first substrate and the second substrate;
    a backlight unit which is disposed on the first substrate opposite to the second substrate and provides light to the first substrate;
    an upper polarizing layer which is disposed on the second substrate and comprises:
       a polarizing portion which polarizes light incident on the polarizing portion; and
       a reflecting portion which reflects light incident on the reflecting portion; and
    a lower polarizing layer between the first substrate and the backlight unit,
    wherein the upper polarizing layer further comprises:
       a plurality of color filters disposed on the polarizing portion, and
       a thin color filter corresponding to the reflecting portion, wherein the thickness of the thin color filter is less than that of the plurality of color filters.

18. The display device as claimed in claim 17, wherein the polarizing portion has a wire grid polarizer pattern.

19. The display device as claimed in claim 17, wherein the reflecting portion is a mirror reflecting layer.

20. The display device as claimed in claim 17, wherein the upper polarizing layer further comprises a metal.

21. The display device as claimed in claim 20, wherein the metal comprises at least one of aluminum (Al), silver (Ag), titanium (Ti), and chromium (Cr).

22. The display device as claimed in claim 17, wherein an angle between a light transmission axis of the upper polarizing layer and a light transmission axis of the lower polarizing layer is about 90 degrees.

23. The display device as claimed in claim 8, the pixel electrode includes a transparent conductive electrode.

24. The display device as claimed in claim 8, the reflecting layer is disposed over the entire surface of the first substrate, except for a contact hole exposing a drain electrode.

25. The display device as claimed in claim 8, the reflecting layer is disposed between a color filter and a second insulating layer.

26. The display device as claimed in claim 9, the pixel electrode includes a non-transparent conductive electrode.

* * * * *